(12) United States Patent
Goodman et al.

(10) Patent No.: US 7,029,353 B2
(45) Date of Patent: Apr. 18, 2006

(54) LINE CAPTURE SYSTEM AND METHOD

(75) Inventors: Lion Goodman, San Rafael, CA (US); Michael Croslin, San Rafael, CA (US)

(73) Assignee: CrossLine Solutions, San Rafael, CA (US)

( * ) Notice: Subject to any disclaimer, the term of this patent is extended or adjusted under 35 U.S.C. 154(b) by 0 days.

(21) Appl. No.: 10/851,398

(22) Filed: May 21, 2004

(65) Prior Publication Data
US 2005/0009423 A1    Jan. 13, 2005

Related U.S. Application Data

(60) Provisional application No. 60/473,005, filed on May 23, 2003, provisional application No. 60/478,730, filed on Jun. 13, 2003.

(51) Int. Cl.
*B63C 9/26* (2006.01)

(52) U.S. Cl. .................................. 441/84; 294/82.2

(58) Field of Classification Search ............ 441/80, 441/84, 85; 114/221 R; 294/66.1, 82.1, 294/82.17, 82.2
See application file for complete search history.

(56) References Cited

U.S. PATENT DOCUMENTS

| | | | | |
|---|---|---|---|---|
| 1,873,917 | A | * | 8/1932 | Chichester .................. 258/1.8 |
| 2,594,120 | A | * | 4/1952 | Busher ........................ 43/17.2 |
| 2,704,686 | A | * | 3/1955 | Louck ......................... 294/66.1 |
| 3,097,373 | A | * | 7/1963 | Wisti ............................. 441/85 |
| 3,913,515 | A | * | 10/1975 | Hernsjo et al. ............. 294/19.1 |
| 4,343,056 | A | | 8/1982 | McDonald |
| 4,751,892 | A | * | 6/1988 | Sechel et al. ............ 114/221 R |
| 4,799,906 | A | | 1/1989 | Perkins, Jr. |
| 5,020,742 | A | | 6/1991 | Haslim |
| 5,105,543 | A | | 4/1992 | Maarschalk et al. |
| 5,752,731 | A | | 5/1998 | Crone |
| 5,895,300 | A | | 4/1999 | Borrelli |
| 6,019,651 | A | | 2/2000 | Driscoll et al. |
| 6,050,869 | A | | 4/2000 | Kellett |
| 6,079,761 | A | * | 6/2000 | Sadeck ....................... 294/82.1 |
| RE36,965 | E | | 11/2000 | Salvemini |
| 6,516,920 | B1 | | 2/2003 | Schafler |
| 2001/0024916 | A1 | | 9/2001 | Cynamon |
| 2002/0111095 | A1 | | 8/2002 | Borrelli |
| 2002/0123277 | A1 | | 9/2002 | Weinel |
| 2002/0139239 | A1 | | 10/2002 | Vogl |

OTHER PUBLICATIONS

Atlantic Large Whale Disentanglement Network, The Tool Box, webpage, http://www.coastalstudies.org/entanglementupdate/toolbox.html, Nov. 7, 2002.
Atlantic Large Whale Disentanglement Network, The Tool Box, webpage, http://web.archive.org./web/20010923002920, Jul. 7, 2001.

* cited by examiner

*Primary Examiner*—Andrew D. Wright
(74) *Attorney, Agent, or Firm*—LaRiviere, Grubman & Payne, LLP

(57) ABSTRACT

A system and method involving a line capture device (10) and a flotation apparatus (49), the line capture device (100) having a body (14), at least one line retainer, each line retainer having a line retainer portion (16) and a latching portion (28), for retaining a portion of a captured line (12), and a capturing line (20) extending from the body (14) for pulling the device (10), the captured line (12), and a secondary object, e.g., a victim (40), back to a rescuer, the flotation apparatus (49) having a safety flotation vest (50) housing a deployable flotation device (42) and a deployable line (12) to be captured.

12 Claims, 11 Drawing Sheets

LINE CAPTURE SYSTEM AND METHOD

CROSS-REFERENCE TO RELATED APPLICATIONS

This application is a nonprovisional patent application which relates to, and claims priority from, U.S. 60/473,005, entitled "Line Capture Device," filed May 23, 2003, and also relates to U.S. 60/478,730, also entitled "Line Capture Device," filed Jun. 13, 2003.

TECHNICAL FIELD

The present invention relates to rescue capture systems and methods. More particularly, the present invention relates to line rescue and recreational capture systems and methods. Even more particularly, the present invention relates to rescue, recreational, commercial, and industrial line capture systems and methods.

BACKGROUND ART

The currently existing art involves several devices for various rescue applications. One such invention is a throwable disk-shaped flotation device for use in a water rescue which comprises a break-away disk to be thrown by a rescuer which releases a cumbersome harness for use by the rescuee. Another apparatus is a pole for snaring a rescuee which comprises an elongated member having snare-loops disposed at each end for looping around the rescuee; however, the pole technique requires considerable analysis and judgment on the part of the rescuer for determining the exact manner in which to employ the pole, thereby expending undue rescue time while the rescuee languishes.

Yet other apparatuses comprise a line-throwing rescue gun or a launcher deploying a cylindrical projectile or a "missile" on a line to the rescuee, whereby the rescuee must be conscious and able to grab hold of the projectile or the missile and be pulled to safety. Another apparatus comprises a flotation device having a tow line with a series of rings and a harness, whereby the rescuee must again be conscious and able to affix the harness to himself/herself. For helicopter rescue of water victims, one apparatus comprises a boom with telescoping members for extending a line and a collar to the rescuee, again requiring that the rescuee be conscious and able to place the collar over and around himself/herself. A "man-overboard" apparatus comprises a boom and a sling, again requiring that the rescuee be conscious and able to place the sling over and around himself/herself. Anti-slip rescue snares have also been used but also require consciousness of the victim.

With respect to snow rescue and all-terrain rescue, one apparatus comprises an inflatable bladder connected to a frame of either a snowmobile or an all-terrain vehicle (ATV). Upon sensing submersion under water, the bladder is deployed to keep the vehicle suspended and to allow the rider to climb upon the bladder; however, this apparatus also requires that the rescuee (rider) be conscious and able to swim and hoist himself/herself upon the bladder. Thus, a long-felt need is seen to exist for a simple system and method for capturing a primary object, such as a line, which is remotely located from a user, e.g., a rescuer or a "captor," that also enables the user to retrieve a secondary object, e.g., a rescuee or a "captive," being attached to the primary object and that also enables the user to pull the secondary object to himself/herself.

DISCLOSURE OF THE INVENTION

The present invention involves a system and a method for capturing a primary object, such as a line, which is remotely located from a user, such as a rescuer or a "captor," that also enables the user to retrieve a secondary object, such as a rescuee or a "captive," being attached to the primary object and that also enables the user to pull the secondary object to himself/herself. The present system and method involve the coupling of two distinct lines, either rigid or flexible, in a secure fashion from a distance. The present system generally comprises (a) a line capture device having a capturing line; and (b) a flotation apparatus having a blocking member attached to an end of a captured line for preventing escape of the device upon tensioning, thereby securing a connection of the capturing line as well as the captured line. The present method generally comprises deploying a line capture device across a line to be captured, and capturing the line, thereby effecting a "captured line." The line capture device generally comprises a body and at least one line retainer, each line retainer comprising a line retainer portion and a latching portion, which can be integral with the body, for retaining a portion of the captured line, and can further comprise a capturing line, extending from the body, for pulling the device, the captured line, and the secondary object, e.g., the victim, back to the user or rescuer. The present line retainer does not slip away from the captured line, thereby eliminating the problems experienced in the prior art. The present system further comprises a flotation apparatus, the apparatus comprising a safety flotation vest having a pocket which houses a deployable flotation device and a deployable line to be captured, such line coupling the safety flotation vest to the flotation device. Alternatively, the present flotation apparatus comprises a storage bag which is itself buoyant and a capturing line being itself buoyant (formed from a material such as woven polypropylene which remains buoyant even when saturated with water), the capturing line having a blocking member thereto attached, such blocking member being any object which is dimensionally larger than the line capture device cavity for preventing through-slippage.

In particular, the present method comprises deploying a line capture device, having a capturing line, by a technique such as throwing, firing using a line gun, as well as lowering the device from a helicopter and dragging the device between a line running between a victim wearing the safety flotation vest and an object, wherein the object can be a deployed flotation device or a balloon, whereby the device will capture the line (the captured line), thereby effecting a secure connection to the victim so that he may be dragged, lifted, or hoisted to safety. As such, the victim is not required to swim nor manually effect any line connection. In addition, use of a rescue swimmer is unnecessary in the present method. Thus, an incapacitated victim can be rescued in moving water, open water, or even heavy seas using the present invention without the assistance of the victim or the rescue swimmer.

The present invention system has wide-ranging advantageous applications in many water rescue environments. Such advantages include providing swift water rescue for vertical kayak entrapment as well as foot or leg entrapment, strainer rescue, wrapped raft or craft rescue, throw-bag rescue, and helicopter short haul rescue. Other advantages include providing open water rescue such as man-overboard scenarios on the high seas, line retrieval in either open water or swift water, extraction of tow lines in open water, emergency-stop procedure for out-of-control persons, boats, or other objects, helicopter short-haul extraction without using a rescue swimmer, diversion dam rescue, cliff climbing rescue, other mountainous terrain rescue, mud flow or debris pile rescue during floods, and numerous industrial applications such as commercial fishing, as well as consumer applications, such as recreational fishing and use as a water toy or as a land toy. Other features of the present invention are disclosed, or are apparent, in the section entitled "Detailed Description of the Invention," disclosed, infra.

BRIEF DESCRIPTION OF THE DRAWINGS

For a better understanding of the present invention, reference is made to the below-referenced accompanying Drawings. Reference numbers refer to the same or equivalent parts of the present invention throughout the several figures of the Drawings.

MODES FOR CARRYING OUT THE INVENTION

Figure 1:
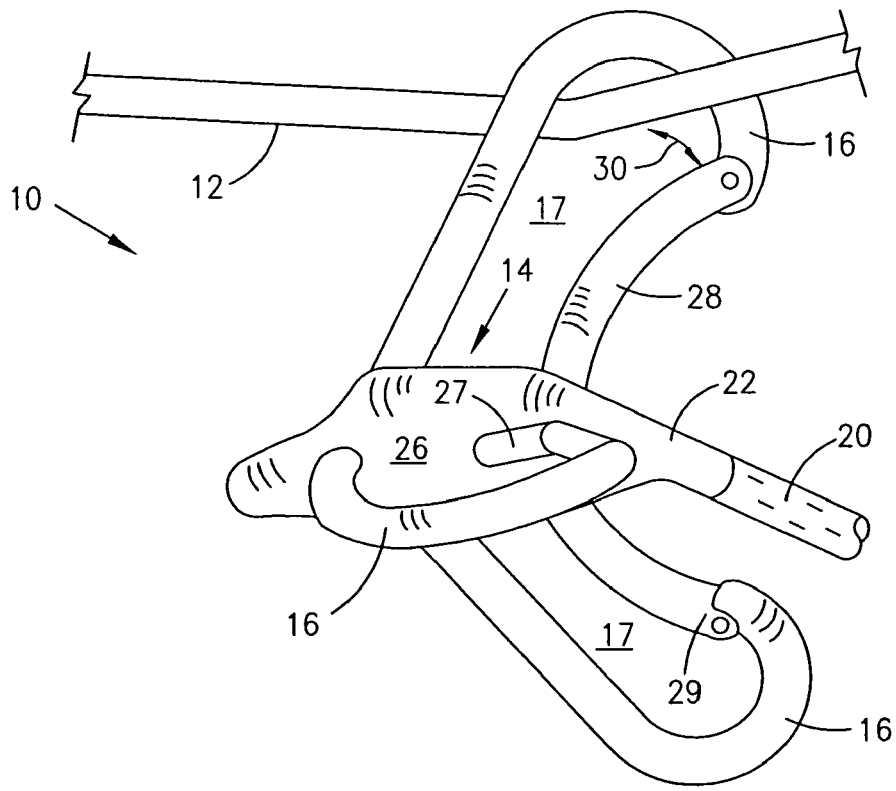
FIG. 1 is a perspective view of a line capture device, in accordance with a first embodiment of the present invention.

FIG. 1 illustrates, in a perspective view, a line capture device 10 comprising at least one line retainer, each line retainer comprising a line retainer portion 16 having a convex configuration, by example only, in accordance with a first embodiment of the present invention. The line capture device 10 captures a line 12, i.e., a "captured line" 12. The line capture device comprises a body 14, having at least one line retainer portion. The body 14 comprises a rigid or a flexible material such as a plastic or any other moldable or millable material. The line retainer comprises a capturing and retaining mechanism such as a carabiner. While FIG. 1 shows three line retainers, here being illustrated by three carabiners, by example only, the present invention may comprise any number of line retainers. Other structures for the line retainer can be a hook used with an eye, a snap-link, a flexible arm, and a wire-gate carabiner. A line retaining cavity 17 is circumscribed by the line retainer for accommodating the captured line 12. The line capture device 10 further includes a capturing line or pull line attachment section 22 for attaching an optional capturing or "pull" line 20, wherein the capturing line 20 is connected. The capturing line attachment section 22 permanently attaches the capturing line 20 to the body 14 using a structure such as a fastener and a fitting. A line retainer portion attachment section 26 attaches the line retainer portions 16 to the body 14 using a technique such as injection molding. The line retainer further comprises a latching portion 28 which opens and closes, i.e., "latches," to retain the captured line 12 and is mechanically coupled to the line retainer portion attachment section 26 by any fastening technique. The latching portion 28 comprises any mechanism, such as a spring or a flexure (not shown), allowing the line 12 to be thereagainst pressed and to thereby effect its opening. The latching portion 28 further comprises a disengaging end 29 which swings inwardly to a stop portion of the line retainer portion 16, thereby capturing the line 12, and outwardly, thereby retaining the line in the line retaining cavity 17. A directional arrow 30 indicates the direction of the latching portion 28 rotation during it operation in capturing and retaining the line 12 in this embodiment. At least one latching portion groove 27 is disposed in the body 14 for facilitating bi-directional movement of the latching portion 28. The line capture device 10 comprises a material such as wood, metal, e.g., aluminum and titanium for resisting corrosion in sea water, an alloy, e.g., steel, a ceramic material, e.g., cement and stone, a polymeric material, e.g., a plastic and rubber for avoiding electrical conduction in industrial applications, and a composite material. In addition, the line retainer, and particularly the line retainer portion 16, can have any of the following relations to the body 14: a fixed relation, a retractable relation, or a telescoping relation.

Figure 2:
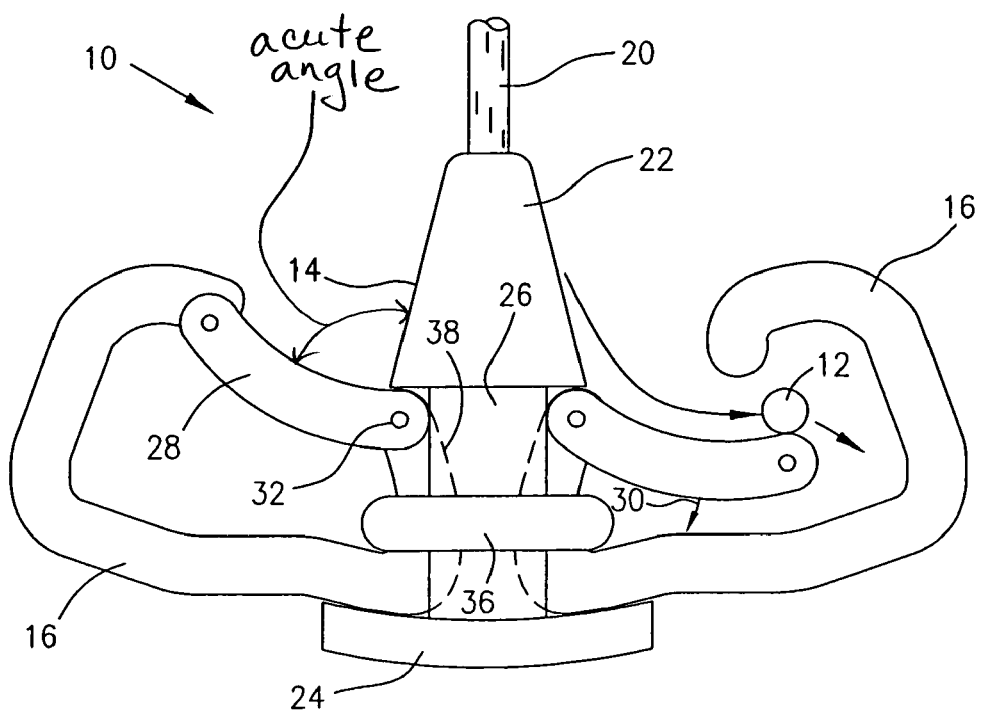
FIG. 2 is a side view of a line capture device, in accordance with a second embodiment of the present invention.

FIG. 2 illustrates, in a side view, the line capture device 10 comprising at least one line retainer, each line retainer comprising a line retainer portion 16 having a convex configuration, in accordance with a second embodiment of the present invention. The latching portion 28 further comprises a fastener such as a pivoting end 32 which operates as a hinging portion for the latching portion 28 and is rotatably coupled to the line retainer portion attachment section 26. The line capture device 10 further includes a binding 36 for securing the line retainer portions 16 to the body 14 within a plurality of line retainer portion grooves 38 disposed within the line retainer portion attachment section 26 and for preventing bending, tipping, or misaligning of the line retainer portions 16. Additionally, although a uniform body 14 for attachment of the retainer portions 16 is illustrated in FIG. 1, any configuration may be used to achieve the intended purpose, such as is alternatively shown in FIG. 2. Specifically, the line capture device 10 further comprises a holding base 24, optionally including a weight, disposed at a distal end of the body 14 for facilitating projection of the line capture device 10 over the line 12 to be captured by strategically adding and disposing mass. The present convex configuration of the line retainer portion 16 is beneficial for accommodating a thick captured line.

Figure 3:
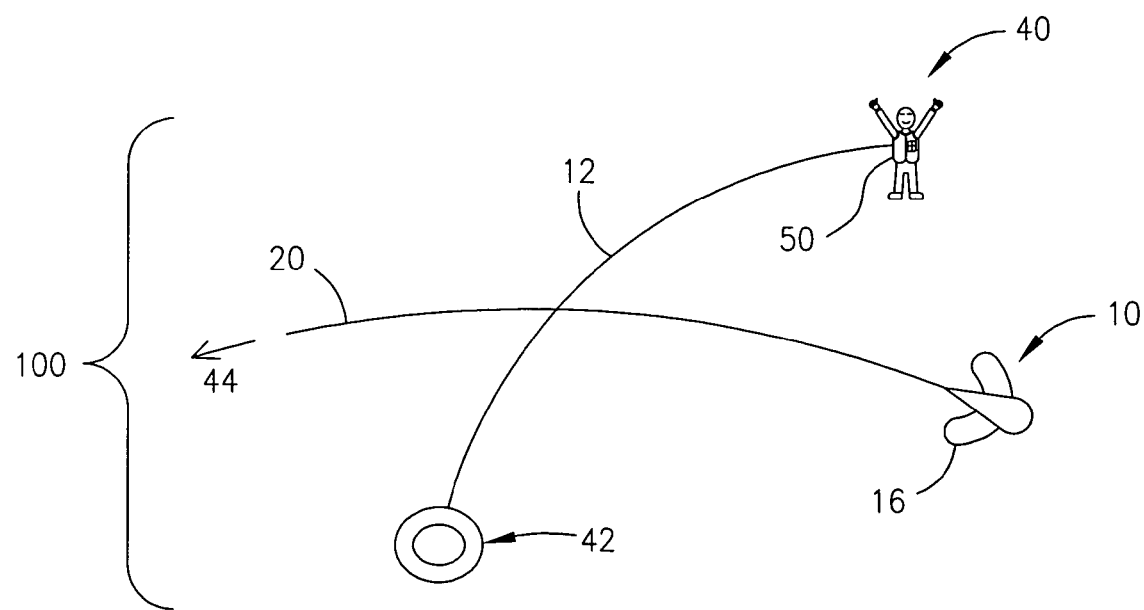
FIG. 3 is a schematic representation of a line capture system, in accordance with the present invention.

FIG. 3 illustrates, in a schematic representation, the operation of the line capture system 100 using the present method, comprising the line capture device 10 coupled to the capturing line 20 being deployed across a line 12 to be captured for rescuing a victim 40 wearing a safety flotation vest 50 being coupled to a deployed flotation device 42 by the deployed line 12, in accordance with the present invention. Alternatively, a victim 40 can be coupled to any line having a blocking member thereto attached, e.g., at a distal end. In addition, the captured line 12 of one line capture device 10 can comprise a capturing line 20 of any other line capture device 10, such as one being deployed by the victim 40 (See also FIGS. 19–22). The system 100 can also be used either on land or in air without the use of the flotation device 42, or in water with the use of the flotation device 42. The flotation device 42 is shown in a toroidal configuration, by example only, but it can comprise any other configuration. The flotation device 42 and the safety flotation vest 50 maintain the line 12 afloat on the surface of the water for facilitating the capture thereof by the line capture device 10. A pull directional arrow 44 of the capturing line 20, illustrates the direction in which the capturing line 20 is to be pulled to cause the line capture device 10 to contact line 12 to be captured. The line capture device 10 is then slid along the line 12 until it reaches the flotation device 42, thereby stopping and securely grappling the line 12 in the vicinity of the flotation device 42 using a blocking member 13 (not shown). Thus, the secure contact between the line capture device 10 and the captured line 12 in the vicinity of the flotation device 42 allows a rescuer to pull the victim 40 to safety. The line capture device 10 comprises a holding base 24, optionally including a weight, as shown in FIG. 2, to firstly facilitate throwing of the device 10 and to secondly facilitate sinking of the device 10 for capturing the line 12. As such, the line capture device 10 comprises many potential materials, for example, wood, metal, and plastic. Furthermore, although carabiners have been herein taught, by example only, the line retainer may comprise many other structures for retaining a line, such as a hook with a wedge. Also, the line capture device 10 further comprises a hoisting device, especially for use in helicopter rescues, whereby the capturing line 20 is coaxially disposed within the body 14 and is pulled through the body 14, thereby allowing the rescuee 40 to be hoisted into the helicopter rather than to be merely dangling therefrom.

Figure 4:
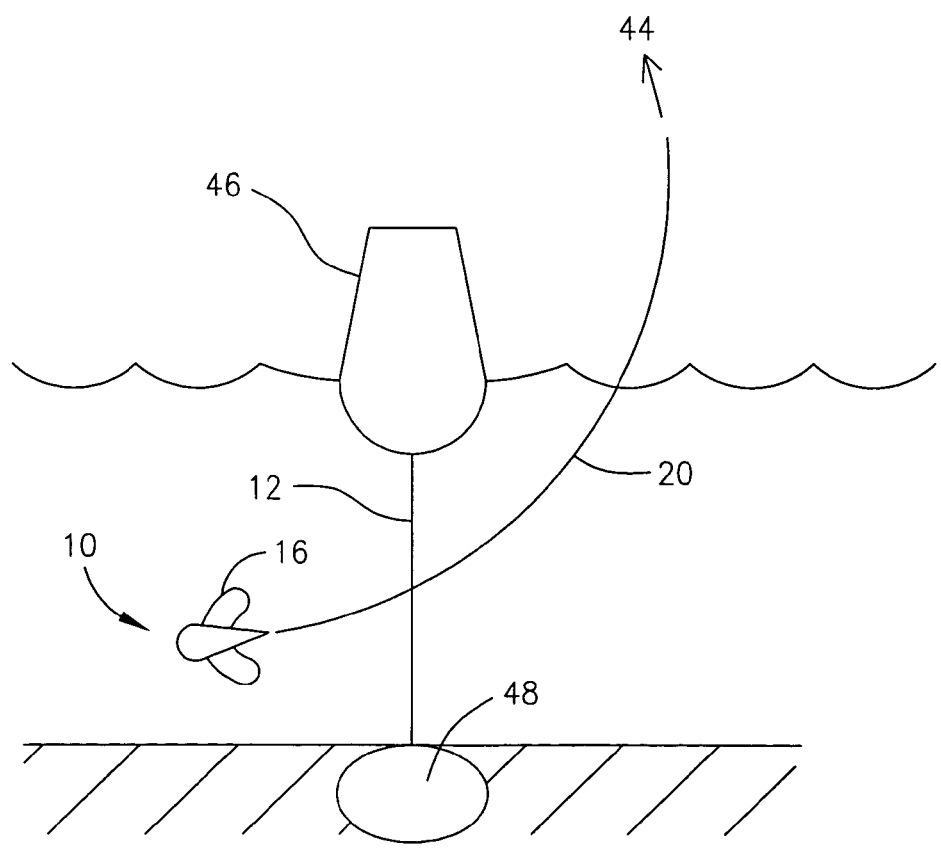
FIG. 4 is a schematic representation of a line capture system in operation, in accordance with a third embodiment of the present invention.

FIG. 4 illustrates, in a schematic representation, the line capture system 100 having the line capture device 10 being deployed across a line 12 to be captured for moving a buoy 46 by dislodging an anchor 48 using the present line capture method comprising pulling the capturing line 20 in the direction indicated by arrow 44, in accordance with a third embodiment of the present invention. The buoy 46 comprises a standard flotation device used for anchoring boats (not shown) and other vessels in harbors or for identifying the location of an object in water. The anchor maintains the position of the buoy 46 in the water. Alternatively, the line capture device 10, having at least one line retainer portion 16, can also be tossed and pulled to capture the line 12 for moving a boat over to the buoy 46 and thereto anchoring the boat in another application of the invention.

Figure 5:
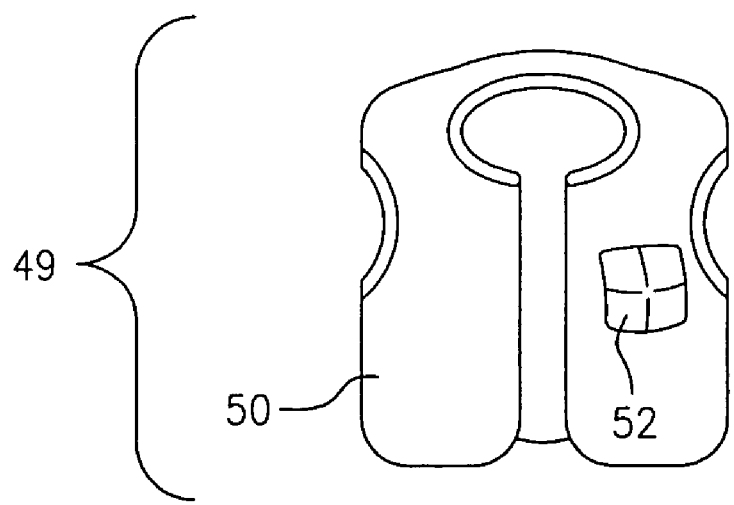
FIG. 5 is a front view of a flotation apparatus, in accordance with the present invention.

FIG. 5 illustrates, in a front view, a flotation apparatus 49 comprising a safety flotation vest 50 having a pocket 52 for housing the line 12 to be captured and the flotation device 42 and a blocking member 13 in an undeployed state, in accordance with the present invention. The safety flotation vest 50 is intended to be either routinely worn or in anticipation of an emergency situation by any person disposed near the water. In anticipation of an emergency condition, e.g., prior to losing consciousness, the rescuee 40, if capacitated, or any other person present if the rescuee 40 is incapacitated, deploys the flotation device 42 and the line 12 from the pocket 52.

Figure 6:
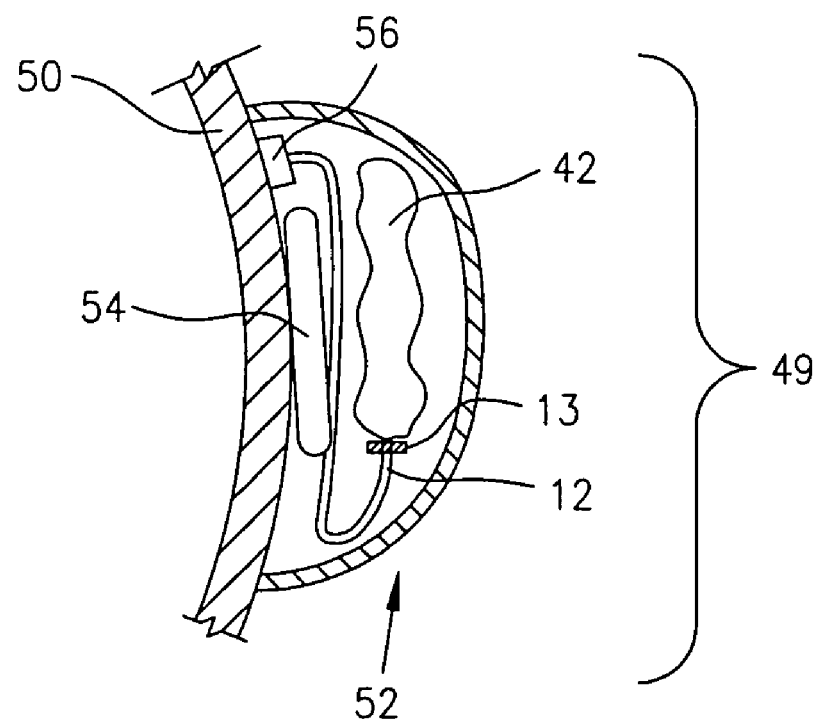
FIG. 6 is a cross-sectional side view of a flotation apparatus, as shown in FIG. 5, in accordance with the present invention.

FIG. 6 illustrates, in a cross-sectional side view, a flotation apparatus 49 comprising a safety flotation vest 50, as shown in FIG. 5, having the pocket 52 for housing the line 12 to be captured and the flotation device 42 in an undeployed state, in accordance with the present invention. The pocket 52 also accommodates other necessary emergency rescue equipment, specifically an ejection device 54 and a line anchor 56. The ejection device 54 deploys the flotation device 42 away from the rescuee 40 upon his/her manual actuation using an actuator, such as a scuba-diving ripcord, if the rescuee 40 has capacity. Typical ejection devices 54 comprise an actuator such as an airbag deployer, air blaster, and the like. The ejection device 54 may also be automated and comprise a feedback and control system, e.g., a sensor, a signal generator, and an actuator, such that neither the consciousness of the rescuee 40 (incapacity) nor the presence of others in the vicinity is required. The line anchor 56 connects the line 12 to the safety flotation vest 50 and is fastened to the vest 50.

Figure 7:
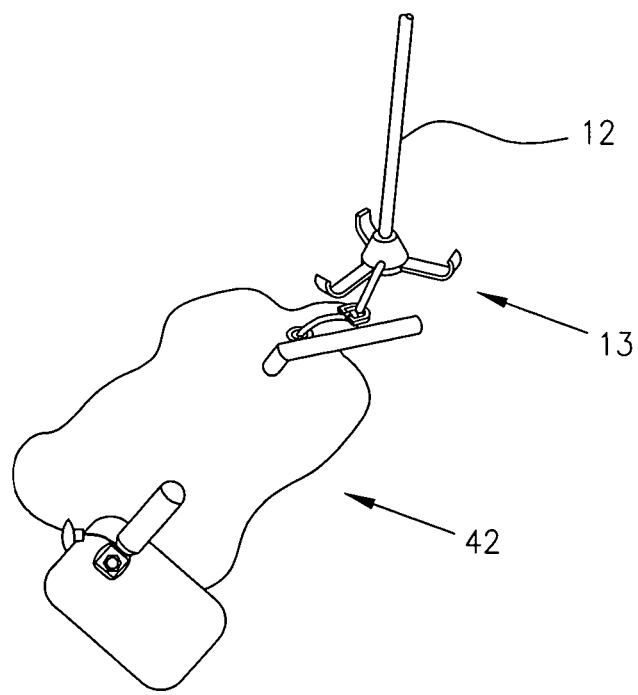
FIG. 7 is a schematic representation of a line capture device, in accordance with the present invention.

FIG. 7 illustrates, in a schematic representation, the line capture device 10 being pulled by a capturing line 20, thereby capturing a line 12 coupled to a flotation device 42, in accordance with the present invention.

Figure 8:
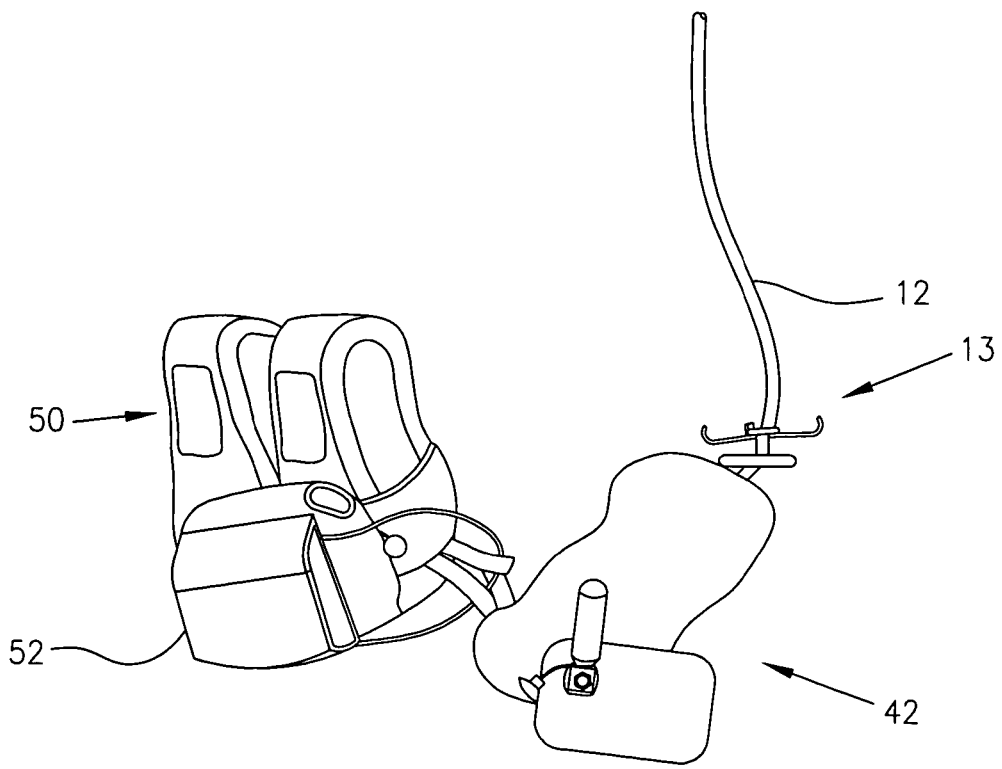
FIG. 8 is a schematic representation of a safety flotation vest, in accordance with the present invention.

FIG. 8 illustrates, in a schematic representation, a safety flotation vest 50 having a pocket 52, as shown in FIG. 5, with a deployed flotation device 42 and a deployed line 12 to be captured, in accordance with the present invention.

Figure 9:
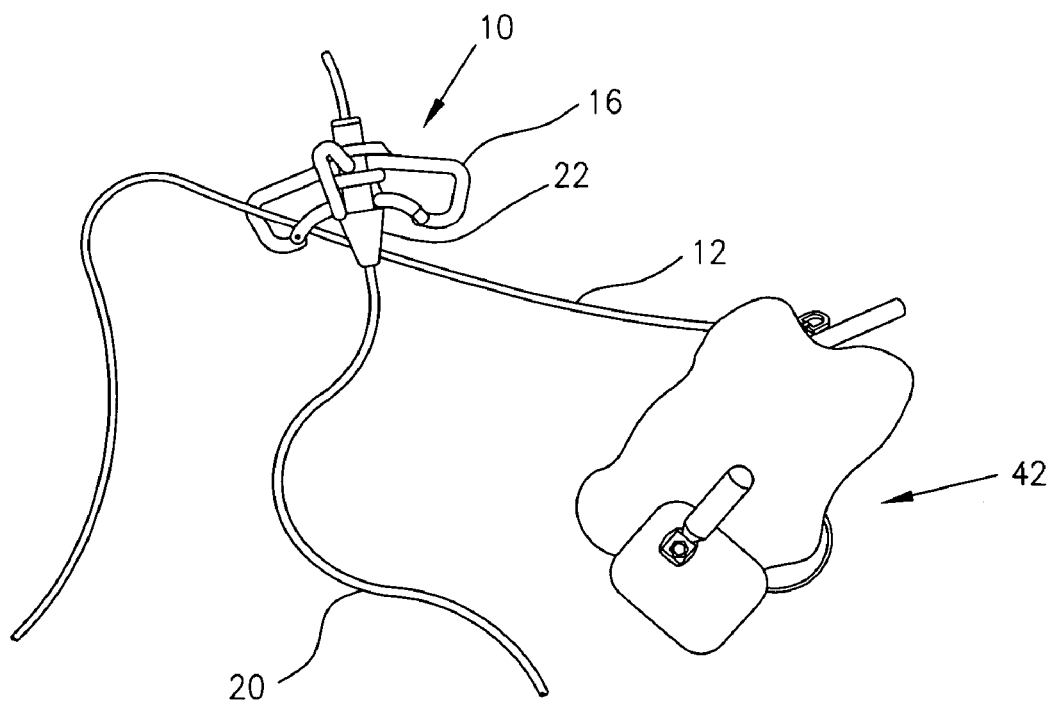
FIG. 9 is a schematic representation of a deployed line capture device, in accordance with the present invention.

FIG. 9 illustrates, in a schematic representation, the deployed line capture device 10 capturing the line 12, being coupled with the flotation device 42, by pulling the capturing line 20, in accordance with the present invention.

Figure 10:
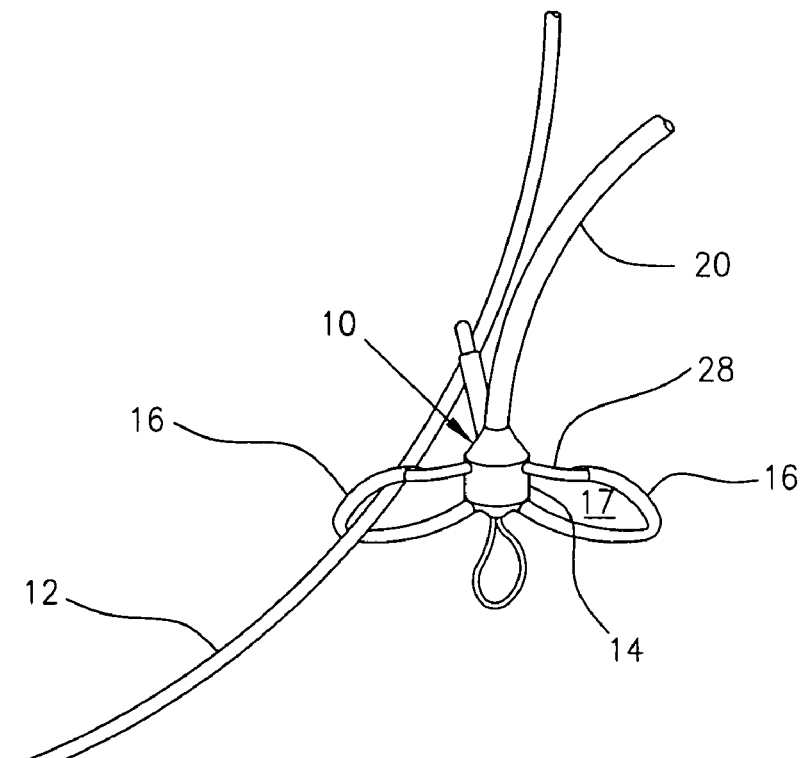
FIG. 10 is a schematic representation of a line capture device retaining a captured line, in accordance with the present invention.

FIG. 10 illustrates, in a schematic representation, a line capture device 10 retaining a captured line 12, in accordance with the present invention.

Figure 11:
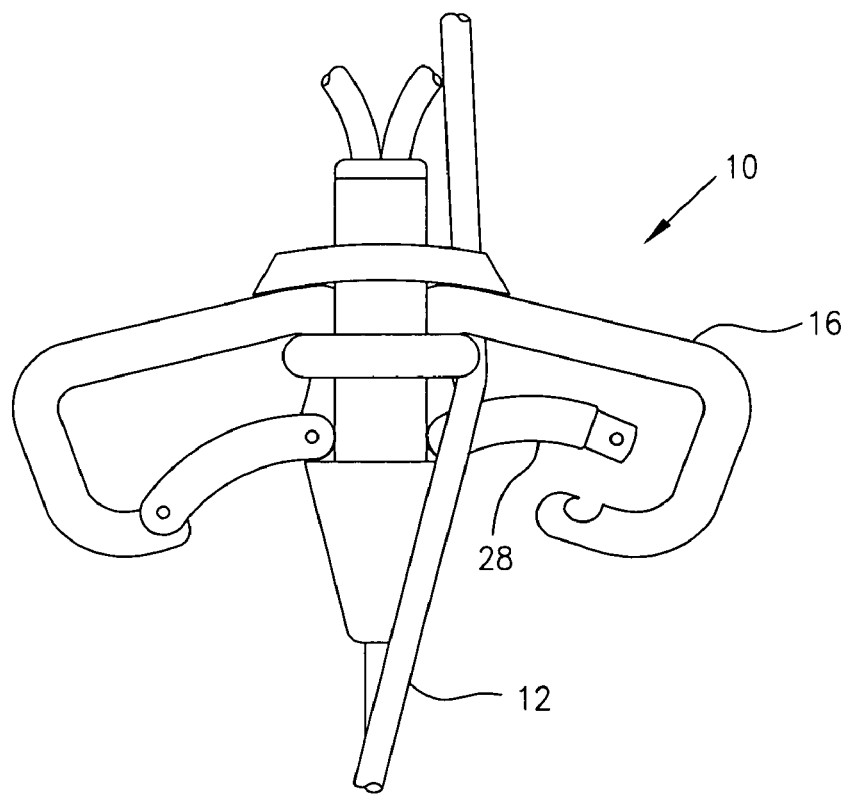
FIG. 11 is a schematic representation of a line capture device retaining a captured line in air as shown from another perspective, in accordance with the present invention.

FIG. 11 illustrates, in a schematic representation, a line capture device 10 retaining a captured line 12 in air shown from another perspective, in accordance with the present invention.

Figure 12:
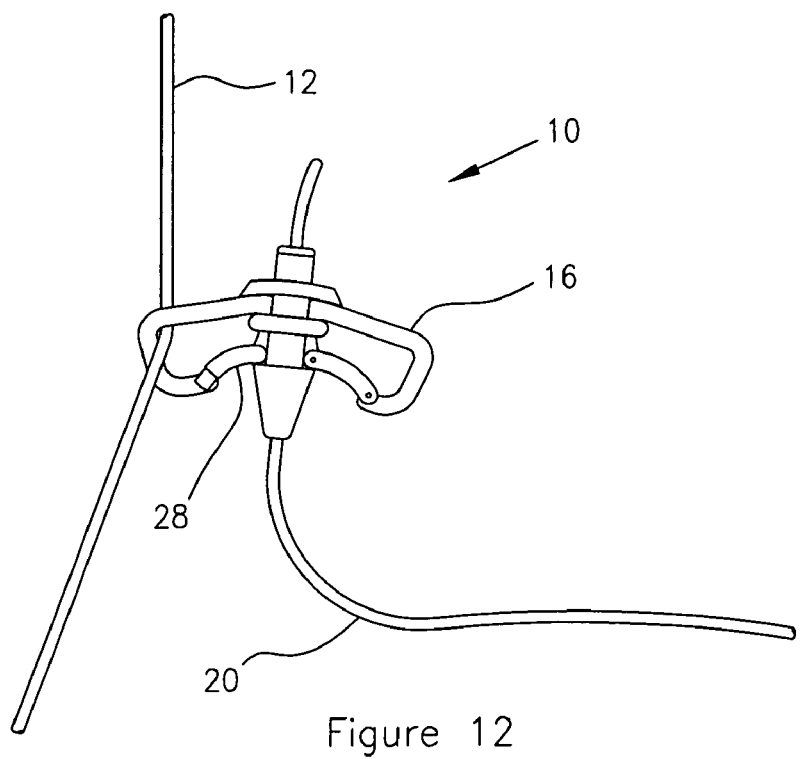
FIG. 12 is a schematic representation of a line capture device retaining a captured line in water, in accordance with the present invention.

FIG. 12 illustrates, in a schematic representation, a line capture device 10 retaining a captured line 12 in water, in accordance with the present invention.

Figure 13:
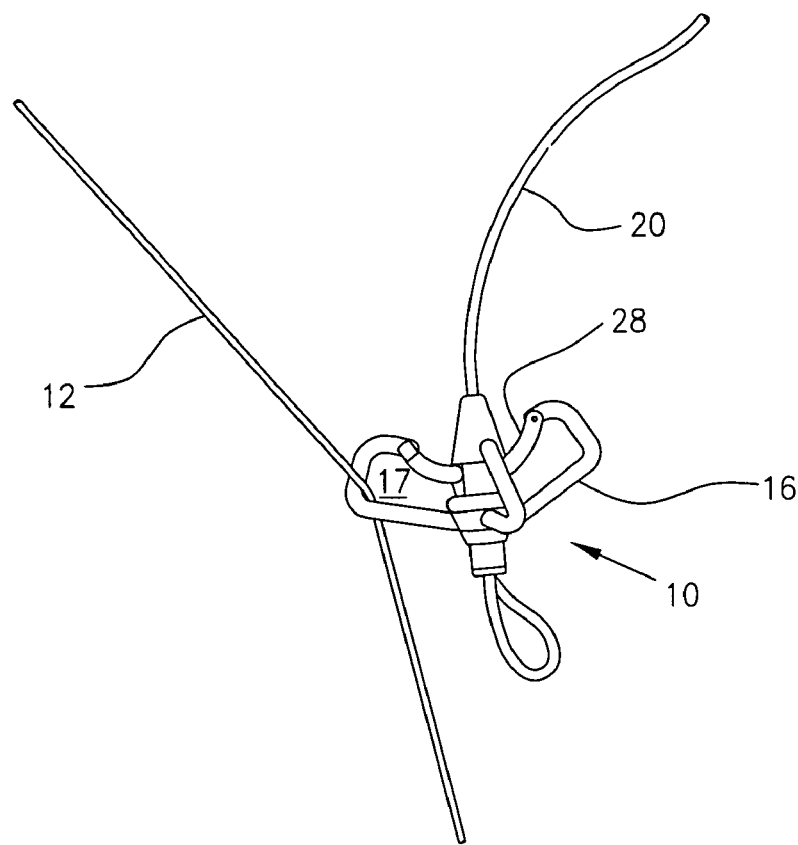
FIG. 13 is a schematic representation of a line capture device retaining a captured line in air, in accordance with the present invention.

FIG. 13 illustrates, in a schematic representation, a line capture device 10 retaining a captured line 12 in air, in accordance with the present invention.

Figure 14:
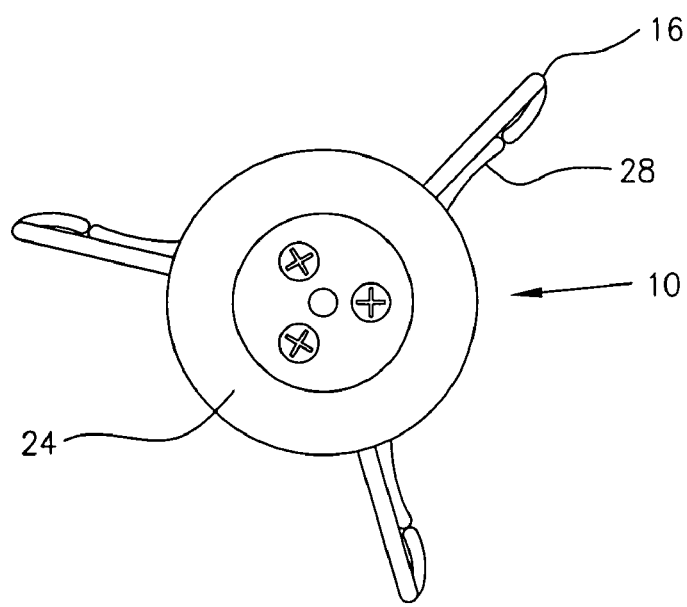
FIG. 14 is a schematic representation (bottom view) of a line capture device, in accordance with the present invention.

FIG. 14 illustrates, in a schematic representation, a bottom view of the line capture device 10 comprising a holding base 24 which can optionally include a weight, in accordance with the present invention.

Figure 15:
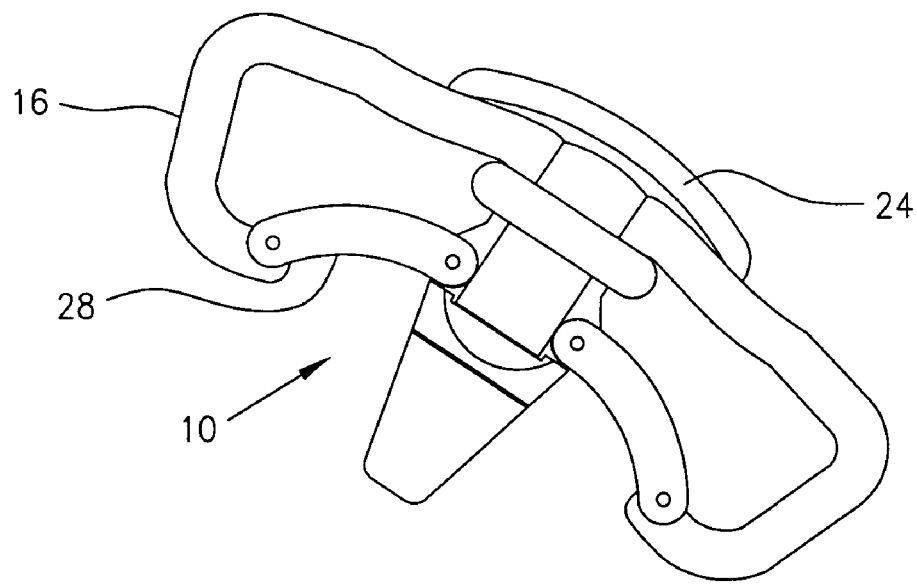
FIG. 15 is a schematic representation of the line capture device, as shown in FIG. 2, in accordance with the present invention.

FIG. 15 illustrates, in a schematic representation, the line capture device 10, as shown in FIG. 2, in accordance with the present invention.

Figure 16:
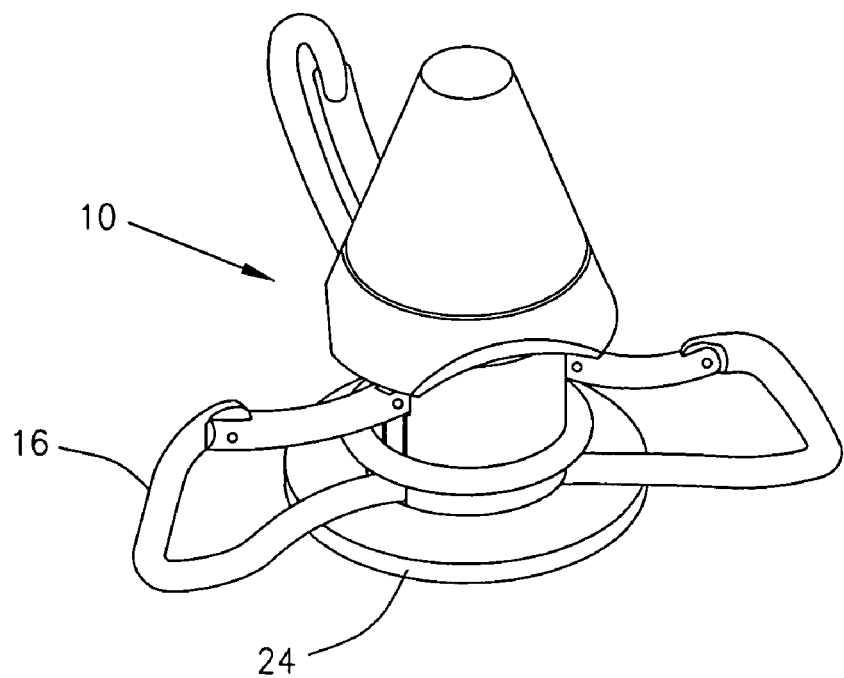
FIG. 16 is a schematic representation (perspective view) of the line capture device, as shown in FIG. 2, in accordance with the present invention.

FIG. 16 illustrates, in a schematic representation, a perspective view of the line capture device 10, as shown in FIG. 2, in accordance with the present invention.

Figure 17:
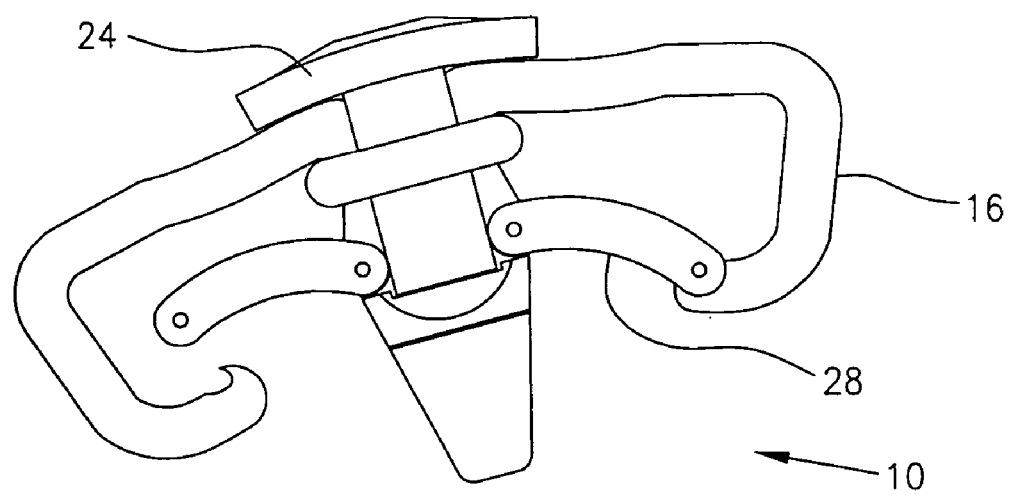
FIG. 17 is a schematic representation of the line capture device, as shown in FIG. 2, in accordance with the present invention.

FIG. 17 illustrates, in a schematic representation, the line capture device 10, as shown in FIG. 2, wherein the latching member 28 is being manually opened, by example only, to indicate the mechanism by which a line 12 would operate to open the latching member 28, in accordance with the present invention.

Figure 18:
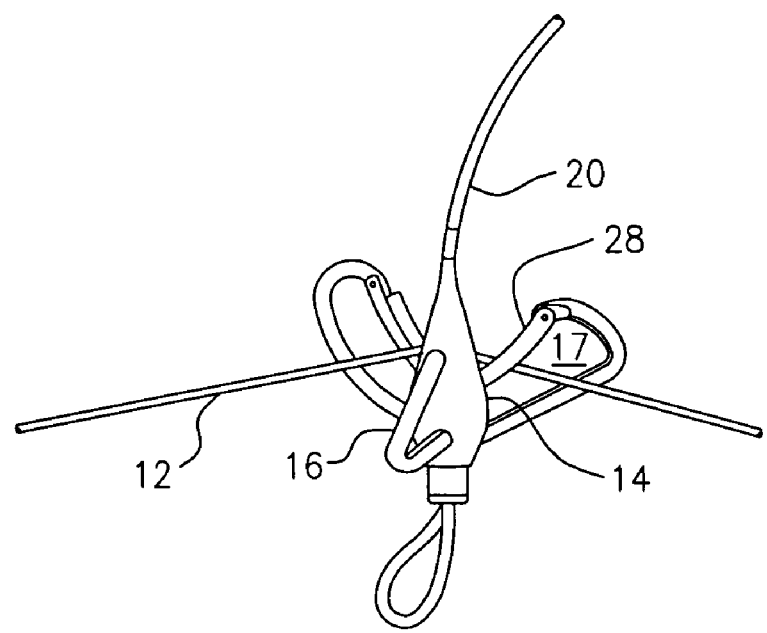
FIG. 18 is a schematic representation of the line capture device, as shown in FIG. 1, retaining a captured line, in accordance with the present invention.

FIG. 18 illustrates, in a schematic representation, the line capture device 10, retaining a captured line 12, as shown in FIG. 1, in accordance with the present invention.

Figure 19:
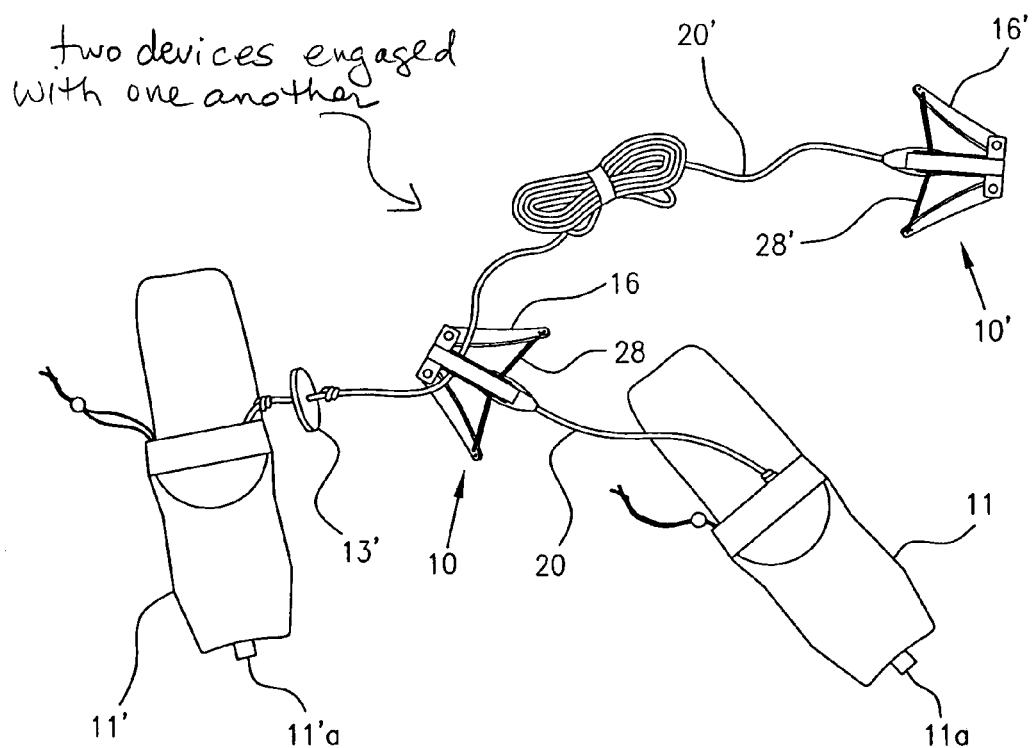
FIG. 19 is a schematic representation of a line capture system, in accordance with a fourth embodiment of the present invention.

FIG. 19 illustrates, in a schematic representation, a line capture system 100 comprising two line capture devices 10, 10', each line capture device 10, 10' comprising at least one line retainer, each line retainer comprising a line retainer portion 16, 16' having a concave configuration, by example only, coupled to a capturing line 20, 20', retaining a captured line 12 (not shown), 12' having a blocking member 13, 13' being a disk member thereto attached and coupled to a buoyant storage bag 11, 11', wherein the captured line 12 of the first device 10 comprises the capturing line 20' for the second device 10', in accordance with a fourth embodiment of the present invention. In other words, when deployed, the two line capture devices 10, 10' cooperate in a manner such that the captured line of the first device is the capturing line of the second device (i.e., the captured line 12=the capturing line 20'), whereby an object attached to the second device may be retrieved by pulling the first device. As such, modular use of the devices 10, 10' provides convenience on land, in air, or in water in the present system 100. The storage bags 11, 11' comprise integral webbing loops 11a, 11a' by which the lines 20, 20' are secured, respectively. The loops 11a, 11a' extend through the bags 11, 11' as necessary to accommodate fastening of the lines 20, 20'. Further, the present line capture system 100 can comprise not only two, but a plurality of line capture devices 10 being cooperatively deployed for retrieving at least one object. In this embodiment, the storage bag 11, 11' can act as either a discrete element or as a pocket 52, which is detachable from the safety flotation vest 50, for holding the necessary equipment discussed, supra. The storage bag 11, 11' is also buoyant. As such, the system 100 is operable without the use of the flotation device 42 of FIGS. 5 and 6 in this and other embodiments of the present invention. The present concave configuration of the line retainer portion 16 is also beneficial for dislodging a stuck anchor, such as the anchor 48 of FIG. 4. The capturing line 20 has a blocking member 13 comprising a disk member, by example only, thereto attached, in accordance with this embodiment.

Figure 20:
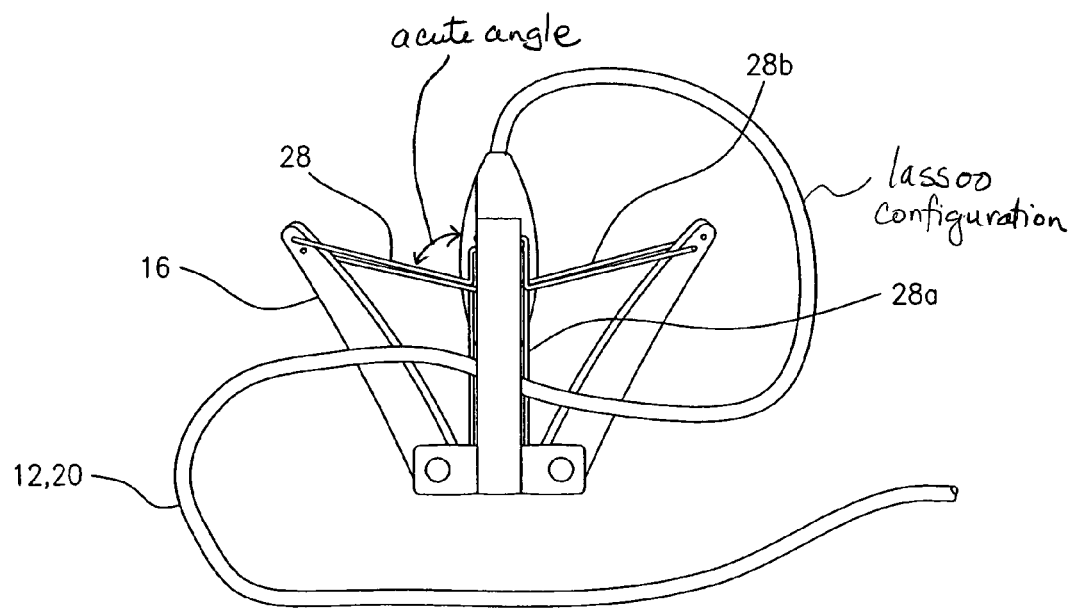
FIG. 20 is a schematic representation of a line capture system, in accordance with a fifth embodiment of the present invention.

FIG. 20 illustrates, in a schematic representation, a line capture system 100 comprising one line capture device 10, the device 10 comprising a line retainer portion 16 having a concave configuration, by example only, and having a capturing line 20 retaining a captured line 12, wherein the captured line 12 comprises the capturing line 20 itself (i.e., captured line 12=the capturing line 20) for wrapping the capturing line 20 around any secondary object, in accordance with a fifth embodiment of the present invention. In addition, as an alternative to the first and second embodiments of FIGS. 1 and 2, the line retainer further comprises a springing mechanism coupling the latching member 28 by an end 28a to the line retainer portion 16 such that an end 28b of the latching member 28 slides down the body 14 when opening and springs into its original position upon closing.

Figure 21:
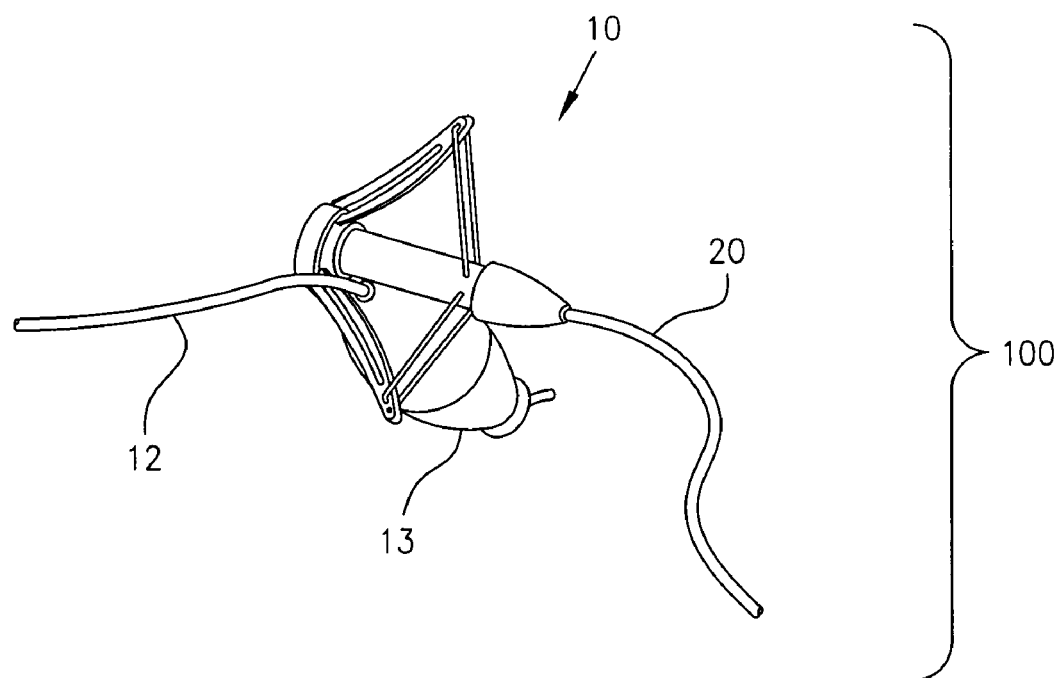
FIG. 21 is a schematic representation of a line capture system, in accordance with a sixth embodiment of the present invention.

FIG. 21 illustrates, in a schematic representation, a line capture system 100 comprising a line capture device 10 with a line retainer portion 16 having a concave configuration, by example only, having a capturing line 20 retaining a captured line 12 having a blocking member 13 being an ellipsoidal member, such as a buoy or any other object being dimensionally larger than the line retainer cavity 17, by example only, thereto attached, in accordance with a sixth embodiment of the present invention. The blocking member 13 comprises any configuration such as a plate, a rectanguloid, a disk, a cone, an elliptic cone, a cylinder, a sphere, a polyhedron, a hyperboloid, a hyperboloid of one sheet, a hyperboloid of two sheets, an elliptic paraboloid, a hyperbolic paraboloid, and an ellipsoid. The tensioning and grappling effect is shown in FIG. 21.

Figure 22:
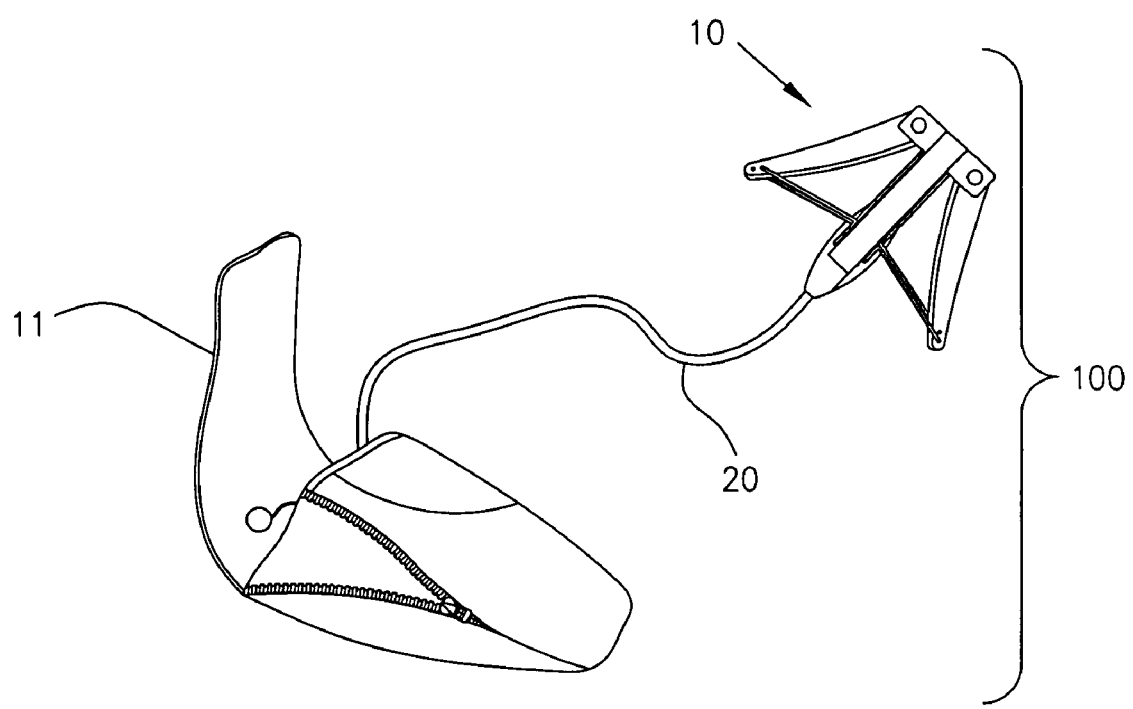
FIG. 22 is a schematic representation of a line capture system, in accordance with the present invention.

FIG. 22 illustrates, in a schematic representation, a line capture system 100 comprising a storage bag 11 housing a line capture device 10 and the capturing line 20, the device 10 comprising a line retainer portion 16 having a concave configuration, by example only, coupled to a capturing line 20 having a blocking member 13 (not shown) thereto attached, in accordance with the present invention.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication material detail may be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention industrially relates to many water rescue applications, including swift water rescue for vertical kayak entrapment as well as foot or leg entrapment, strainer rescue, wrapped raft or craft rescue, throw-bag rescue and helicopter short haul rescue, open water rescue such as man-overboard scenarios on the high seas, line retrieval in either open water or swift water, extraction of tow lines in open water, emergency-stop procedure for out-of-control persons, boats, and other objects, helicopter short-haul extraction without using a rescue swimmer, diversion dam rescue, mud flow or debris pile rescue during floods, as well as other recreational, commercial, and industrial applications, whether in air, in water, or on land.

What is claimed is:

1. A line capture device, comprising:
   a body having a line attachment section disposed at a proximal end and a line retainer portion attachment section disposed at a distal end;
   at least one line retainer, being radially disposed and coupled to the line retainer portion attachment section at the distal end, for retaining a line to be captured, each line retainer having a cavity for accommodating a captured line; and
   means for binding the line retainer portion to the body within a line retainer portion groove disposed within the line retainer portion attachment section for preventing bending, tipping, or misaligning of the line retainer portion,
   wherein each at least one line retainer comprises:
      a line retainer portion coupled to the line retainer portion attachment section, the line retainer portion having a generally straight arm configuration; and
      a latching portion mechanically coupled to the line retainer portion attachment section, the latching portion having a pivoting end and being in movable relation to the line retainer portion, the pivoting end being selected from a group consisting of a proximal end of the latching portion and a distal end of the latching portion, and
   wherein the latching portion comprises a mechanism disposed at the pivoting end which selected from a group consisting essentially of a spring and a flexure for allowing a line to be captured to be thereagainst pressed and to thereby effect opening of the latching portion.

2. A device, as recited in claim 1, comprising at least three line retainers.

3. A device, as recited in claim 1, wherein the line retainer portion comprises a configuration selected from a group consisting essentially of a convex arm and a concave arm.

4. A device, as recited in claim 1, wherein the line retainer portion comprises a feature selected from a group consisting essentially of:
   having a fixed relation to the body;
   having a collapsible and deployable relation to the body; and
   having a springing relation to the body.

5. A device, as recited in claim 1, wherein each at least one line retainer comprises a structure selected from a group consisting essentially of a carabiner, a clip, a hook used with a clip, and a hook used with a wedge.

6. A device, as recited in claim 1, wherein the body further comprises at least one latching portion groove for facilitating movement of the latching portion for capturing a line.

7. A device, as recited in claim 1, further comprising a weight disposed at the distal end of the body for facilitating projection of the line capture device over a line to be captured.

8. A device, as recited in claim 1, comprising a material selected from a group consisting essentially of a buoyant material, a wood, a metal, an alloy, a ceramic material, a polymeric material, and a composite material.

9. A device, as recited in claim 1, further comprising:
   a weight disposed at the distal end of the body for facilitating projection of the line capture device over a line to be captured; and
   a material selected from a group consisting essentially of a buoyant material, a wood, a metal, an alloy, a ceramic material, a polymeric material, and a composite material,
   wherein the at least one line retainer comprises at least three line retainers,
   wherein the line retainer portion comprises a configuration selected from a group consisting essentially of a convex arm and a concave arm,
   wherein the line retainer portion comprises a feature selected from a group consisting essentially of:
      having a fixed relation to the body;
      having a collapsible and deployable relation to the body; and
      having a springing relation to the body,
   wherein each at least three line retainers comprises a structure selected from a group consisting essentially of a carabiner, a clip, a hook used with a clip, and a hook used with a wedge,
   wherein the body further comprises at least one latching portion groove for facilitating movement of the latching portion for capturing a line.

10. A line capture device, comprising:
    a body having a line attachment section disposed at a proximal end and a line retainer portion attachment section disposed at a distal end;
    at least one line retainer, being radially disposed and coupled to the line retainer portion attachment section at the distal end, for retaining a line to be captured, each line retainer having a cavity for accommodating a captured line;
    a capturing line being coupled to the line attachment section disposed at the proximal end for pulling the body and the at least one line retainer portion for capturing a line; and
    means for binding the line retainer portion to the body within a line retainer portion groove disposed within the line retainer portion attachment section for preventing bending, tipping, or misaligning of the line retainer portion,
    wherein each at least one line retainer comprises:
       a line retainer portion coupled to the line retainer portion attachment section, the line retainer portion having a generally straight arm configuration; and
       a latching portion mechanically coupled to the line retainer portion attachment section, the latching portion having a pivoting end and being in movable relation to the line retainer portion, the pivoting end being selected from a group consisting of a proximal end of the latching portion and a distal end of the latching portion, and
    wherein the latching portion comprises a mechanism disposed at the pivoting end which selected from a group consisting essentially of a spring and a flexure for allowing a line to be captured to be thereagainst pressed and to thereby effect opening of the latching portion.

11. A device, as recited in claim 10, wherein the captured line comprises the capturing line itself.

12. A line capture system, comprising:

at least two line capture devices for mechanical cooperation with one another, wherein each device of the at least two line capture devices comprises:

a body having a line attachment section disposed at a proximal end and a line retainer portion attachment section disposed at a distal end;

at least one line retainer, being radially disposed and coupled to the line retainer portion attachment section at the distal end, for retaining a line to be captured, each line retainer having a cavity for accommodating a captured line; and means for binding the line retainer portion to the body within a line retainer portion groove disposed within the line retainer portion attachment section for preventing bending, tipping, or misaligning of the line retainer portion, wherein each at least one line retainer comprises:

a line retainer portion coupled to the line retainer portion attachment section, the line retainer portion having a generally straight arm configuration; and a latching portion mechanically coupled to the line retainer portion attachment section, the latching portion having a pivoting end and being in movable relation to the line retainer portion, the pivoting end being selected from a group consisting of a proximal end of the latching portion and a distal end of the latching portion, and wherein the latching portion comprises a mechanism disposed at the pivoting end which selected from a group consisting essentially of a spring and a flexure for allowing a line to be captured to be thereagainst pressed and to thereby effect opening of the latching portion.

* * * * *